United States Patent [19]

Hirzle

[11] Patent Number: 5,424,943
[45] Date of Patent: Jun. 13, 1995

[54] CONTROL PROCESS WITH TEMPORALLY CYCLICALLY CONTROLLED DETERMINATION OF MANIPULATED VARIABLES IN ACCORDANCE WITH A FUZZY LOGIC

[75] Inventor: Anton Hirzle, Jettingen, Germany

[73] Assignee: Mercedes-Benz AG, Germany

[21] Appl. No.: 151,308

[22] Filed: Nov. 10, 1993

[30] Foreign Application Priority Data

Nov. 10, 1992 [DE] Germany ................ 42 37 857.5

[51] Int. Cl.$^6$ ............................................. G05B 13/02
[52] U.S. Cl. ................................ 364/164; 364/148; 395/906
[58] Field of Search ................ 364/164, 148–151, 364/161; 395/3, 61, 900–906

[56] References Cited

U.S. PATENT DOCUMENTS

| | | |
|---|---|---|
| 4,830,508 | 5/1989 | Higuchi et al. . |
| 5,051,932 | 9/1991 | Inoue et al. . |
| 5,149,472 | 9/1992 | Suganuma . |
| 5,251,124 | 10/1993 | Matsunaga ................ 364/161 |
| 5,272,621 | 12/1993 | Aoki ................ 364/161 |

FOREIGN PATENT DOCUMENTS 025682 2/1988 European Pat. Off. .
0481492 4/1992 European Pat. Off. .
2252426 8/1992 United Kingdom .

OTHER PUBLICATIONS

Liang–Jong Huang et al., A Self–Paced Fuzzy Tracking Controller for Two–Dimensional Motion Control, vol. 20, No. 5, Sep. 1990, pp. 1115–1124.

Primary Examiner—James P. Trammell
Attorney, Agent, or Firm—Evenson, McKeown, Edwards & Lenahan

[57] ABSTRACT

A control process with temporally cyclically controlled determination of manipulated variables in accordance with a fuzzy logic improves the control process by providing an improved reaction to changes to the input variable. In the control process of the invention, a fictitious, probable input variable of the next following cycle is determined. This probable input value is considered in the determination of the manipulated variable. In this way, account is taken of a probable development of the input variable and appropriate action is taken in advance on the manipulated variable. The consideration of an extrapolated future, fictitious input variable value is possible, since control loops with fuzzy controllers are not inclined to show a resonance behavior between control variable and manipulated variable, as is usual with conventional controlled systems.

7 Claims, 1 Drawing Sheet

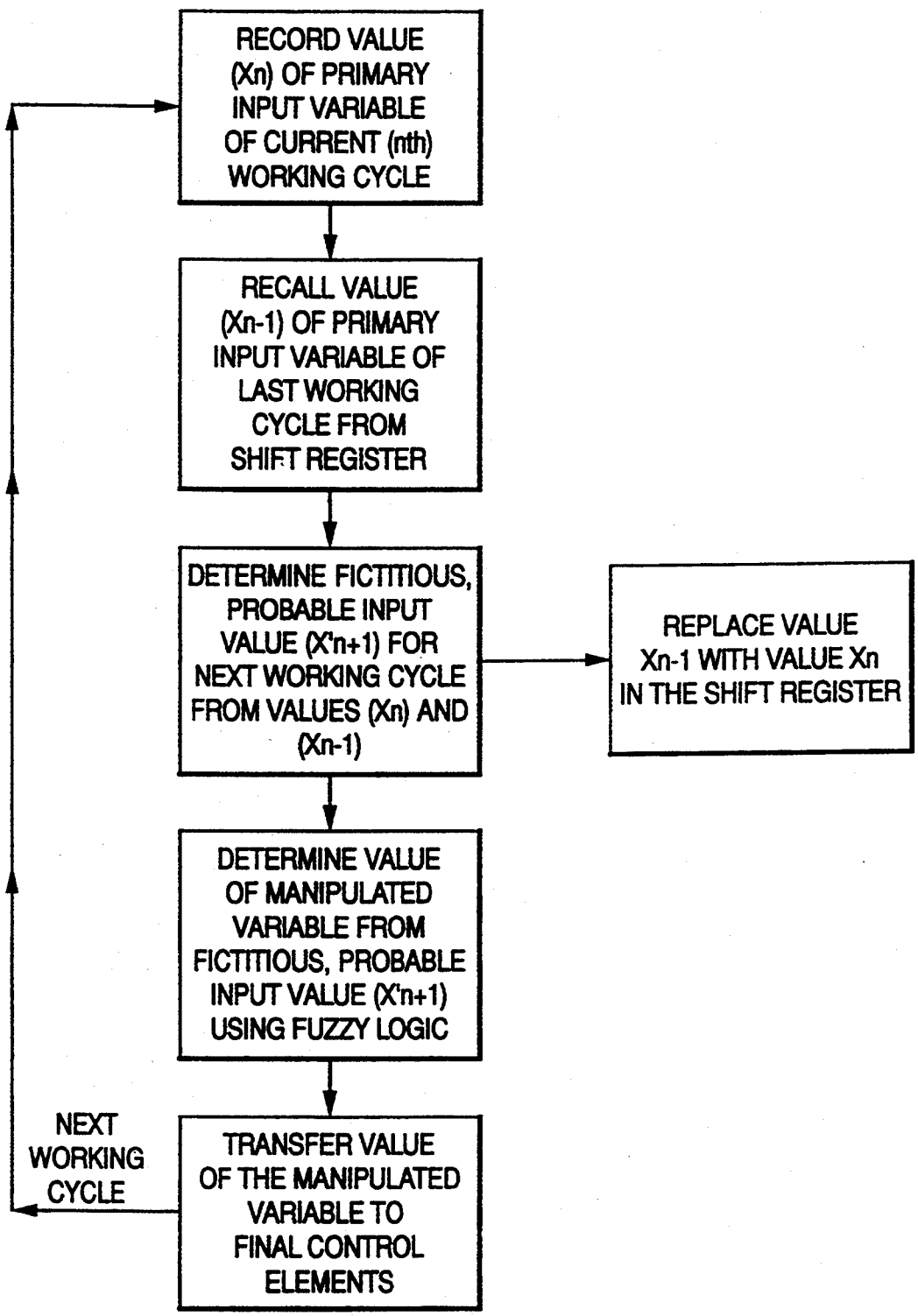

CONTROL PROCESS WITH TEMPORALLY CYCLICALLY CONTROLLED DETERMINATION OF MANIPULATED VARIABLES IN ACCORDANCE WITH A FUZZY LOGIC

BACKGROUND AND SUMMARY OF THE INVENTION

The present invention relates to a control process with temporally cyclically controlled determination of manipulated variables from primary input values (actual values) in accordance with a fuzzy logic, in which the manipulated variables act on the controlled system in the sense of a reduction of a theoretical/actual deviation.

Such a process is disclosed, by way of example, in the article "Fuzzy Control—heuristic control by means of fuzzy logic", which appears in the German journal "Automatisierungstechnische Praxis" ATP 4/1992, pages 176–183 and 5/1992, pages 239–246. In the article, the general mode of operation of fuzzy controllers is described. Furthermore, the various control characteristics are established.

In order to permit a rapid reaction by the controller to a defect which has occurred, controllers are known from the conventional control technology that exhibit a differentiation component (D-component). Differential control behavior is, by definition, only a reaction to an alteration of the primary input variable. Fuzzy controllers of themselves do not possess any such D-component. By appropriate choice of the determinable parameters of the fuzzy controller, it is possible, as described in the article, to approximate a differential controller behavior.

The object of the invention is to improve the control process which forms the basis of the type discussed above so that an improved reaction to changes to the input variable is permitted.

This and other objects are achieved by the present invention which provides a control process with temporally cyclically controlled determination of manipulated variables of a controlled system from primary input variables representing actual values in accordance with a fuzzy logic. The manipulated variables act on the controlled system to reduce a theoretical or actual deviation. The control process comprises the steps of determining a fictitious input variable of a next following cycle from a primary input variable of a last past cycle and the primary input variable of a current cycle; and determining the manipulated variable according to the fuzzy logic, including the step of implying at least the determined fictitious primary input variable cycle in the determination of the manipulated variable.

By the determination of the fictitious, probable input variable of the next following cycle and consideration of this value in the determination of the manipulated variable, account is taken of a probable development of the input variable and appropriate action is taken in advance on the manipulated variable. The consideration of an extrapolated future, fictitious input variable value is possible, since control loops with fuzzy controllers are not inclined to show a resonance behavior between a control variable and a manipulated variable, as usual with conventional controlled systems.

Other objects, advantages and novel features of the present invention will become apparent from the following detailed description of the invention when considered in conjunction with the accompanying drawings.

BRIEF DESCRIPTION OF THE DRAWINGS

The single drawing figure illustrates the control process according to an embodiment of the present invention.

DETAILED DESCRIPTION OF PREFERRED EMBODIMENTS

For the sake of simplicity, in the following description of the present invention, the described control process relates to only one considered input variable. However, the process of the invention may also be applied to a control responding to a plurality of input variables, in that a fictitious, probable input variable is determined in the same manner for each input variable.

In an n-th working cycle, the value $X_n$ of a primary input variable is recorded by the control. As a rule, this value $X_n$ is the metrologically prepared, in most cases amplified signal of a signal generator, this signal having been subjected to an analog/digital conversion. A previous value $X_{n-1}$ has been filed in the shift register exhibiting a storage location in a previous cycle. From this previous value $X_{n-1}$ of the primary input variable the value $X'_{n+1}$ of a fictitious, probable input variable, is determined by linear extrapolation, i.e. according to the equation $X'_{n+1} = 2*X_n - X_{n-1}$. The value $X'_{n+1}$ of the fictitious, probable input variable corresponds to the value of the input variable in the next working cycle, if the input variable were to continue to change linearly as it did approximately linearly during the preceding working cycle. After this computation, the value $X_n$ of the input variable is input into the shift register. As a result of this, the value $X_{n-1}$ is deleted from the memory.

Using the value $X'_{n+1}$ of the fictitious, probable input variable, the value of the manipulated variable is determined by means of a fuzzy logic and is transferred to the final control elements. The next cycle, the n+1-th working cycle, then follows. The single drawing figure illustrates this process in block diagram form.

It is also possible to consider additional past working cycles. In this manner, the determination of the value of the fictitious, probable input variable is not limited only to the value $X_{n-1}$ of the input variable, but also the values $X_{n-2}$ etc. are considered. Likewise, the control process is not limited to the linear extrapolation. If more than the two last determined values of the input variable are relied upon for the determination of the fictitious, probable input variable, extrapolations corresponding to higher orders can be used, which better reproduce the behavior of the controlled system. In this case, the order of the extrapolation is limited by the number of considered values of the input variable. Likewise, non-polynomial extrapolation methods of corresponding order which are matched to the behavior of the system can be used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Control process with temporally cyclically controlled determination of manipulated variables from primary input variables representing actual values in accordance with a fuzzy logic, the manipulated variables acting on the controlled system to reduce a theoretical/actual deviation, the process comprising:

determining a fictitious input variable of a next following cycle based only on measured actual values of a primary input variable for at least a last past cycle and the primary input variable for a current cycle; and determining the manipulated variable according to the fuzzy logic, including the step of implying at least the determined fictitious primary input variable in said next following cycle in the determination of the manipulated variable.

2. Control process according to claim 1, wherein the fictitious input variable is determined using the primary input variable from a plurality of past cycles and from the primary input variable of the current cycle.

3. Control process according to claim 1, further comprising wherein those input variables of the past cycles which are considered for the determination of the fictitious input variable are stored in a shift register.

4. Control process according to claim 1, wherein the fictitious input variable is determined by linear extrapolation.

5. Process according to claim 1 wherein said determining step comprises an extrapolation based solely on said values of said primary input variable for said last past cycle and said current cycle.

6. Process according to claim 5 wherein said extrapolation is linear extrapolation, performed using the equation $$X'_{n+1} = 2 * X_n - X_{n-1}$$

wherein X represents said primary input variable, X' represents the extrapolated value of the primary input variable and n is the cycle number.

7. Process according to claim 5 wherein said extrapolation is at least a second order extrapolation.

* * * * *